United States Patent
Yee et al.

(10) Patent No.: US 7,324,252 B2
(45) Date of Patent: Jan. 29, 2008

(54) ELECTROMAGNETIC SCANNING MICRO-MIRROR AND OPTICAL SCANNING DEVICE USING THE SAME

(75) Inventors: Young-Joo Yee, Gyeonggi-do (KR); Chang-Hyeon Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 19 days.

(21) Appl. No.: 11/335,093

(22) Filed: Jan. 18, 2006

(65) Prior Publication Data

US 2006/0158710 A1 Jul. 20, 2006

(30) Foreign Application Priority Data

Jan. 19, 2005 (KR) .................. 10-2005-0005126

(51) Int. Cl.
*G02B 26/08* (2006.01)
(52) U.S. Cl. .................. 359/224; 359/198; 359/214
(58) Field of Classification Search ................ 359/205, 359/212, 215, 224, 871, 872, 295, 198
See application file for complete search history.

(56) References Cited

U.S. PATENT DOCUMENTS

| | | | | |
|---|---|---|---|---|
| 5,629,790 A | * | 5/1997 | Neukermans et al. ....... | 359/198 |
| 6,538,799 B2 | * | 3/2003 | McClelland et al. ........ | 359/291 |
| 6,765,706 B2 | * | 7/2004 | Tokuda et al. .............. | 359/220 |
| 6,942,814 B2 | * | 9/2005 | Wood et al. .................. | 216/24 |
| 7,196,830 B2 | * | 3/2007 | Torashima et al. .......... | 359/197 |
| 2002/0046985 A1 | * | 4/2002 | Daneman et al. ............. | 216/2 |
| 2002/0171901 A1 | * | 11/2002 | Bernstein .................... | 359/199 |
| 2003/0137711 A1 | * | 7/2003 | Yagi et al. ................... | 359/224 |
| 2004/0036942 A1 | * | 2/2004 | Abu-Ageel ................. | 359/237 |
| 2004/0120022 A1 | * | 6/2004 | Cannon et al. ............. | 359/199 |
| 2006/0152106 A1 | * | 7/2006 | Yan et al. .................... | 310/309 |

\* cited by examiner

*Primary Examiner*—Stephone B. Allen
*Assistant Examiner*—Jade Callaway
(74) *Attorney, Agent, or Firm*—Lee, Hong, Degerman, Kang & Schmadeka

(57) ABSTRACT

An electromagnetic scanning micro-mirror is provided with a magnetic field generator for supplying a magnetic field, a mirror plate having a reflective plane and a frame structure attached to a rear surface of the reflective plane, a substrate to surround the mirror plate, a pair of torsion bars to connect the mirror plate to the substrate, and a magnetic substance provided at the rear surface of the reflective plane of the mirror plate and adapted to generate a drive force by interacting with the magnetic field supplied from the magnetic field generator, wherein the mirror plate performs a rotation operation about the torsion bars, which define the rotating axis of the mirror plate, by use of the drive force generated from the magnetic substance.

18 Claims, 4 Drawing Sheets

ELECTROMAGNETIC SCANNING MICRO-MIRROR AND OPTICAL SCANNING DEVICE USING THE SAME

CROSS-REFERENCE TO RELATED APPLICATIONS

Pursuant to 35 U.S.C. § 119(a), this application claims the benefit of earlier filing date and right of priority to Korean Patent Application No. 10-2005-0005126 filed on Jan. 19, 2005, which is hereby incorporated by reference herein in its entirety.

BACKGROUND OF THE INVENTION

1. Field of the Invention

The present invention relates to an electromagnetic scanning micro-mirror.

The scanning micro-mirror according to the present invention is applicable to laser printers, confocal microscopes, barcode scanners, scanning displays, and other various sensors, which are designed to scan a light beam, emitted from an optical source, to a predetermined region, such as a one-dimensional (i.e. line) or two-dimensional (i.e. plane) region for forming an image or reading position or image data.

The micro-mirror according to the present invention is also applicable to optical switch devices for freely regulating a path of a reflected light beam, in addition to the above scanning function.

2. Description of the Related Art

Recently, with a development in the technology of optical devices, various technologies for utilizing light as information input/output and information transmission media are on the rise. One of the light utilizing technologies is a method for scanning a light beam emitted from an optical source. A typical application example of such a beam scanning technology includes a barcode scanner, basic-level scanning laser display, or the like.

The beam scanning technology requires different scanning speeds and ranges in accordance with application examples thereof. The main focus of prior art beam scanning is a method for regulating an incident angle, which is formed by a reflective plane of a drive mirror, such as a galvanic mirror or rotating polygon mirror, and an incident light beam. Here, the galvanic mirror is suitable for applications requiring a scanning speed of approximately several hertz, perhaps dozens of hertz, whereas the polygon mirror can achieve a scanning speed of approximately thousands of Hertz.

With a development of several technologies, recently, there has been a ceaseless effort for applying the beam scanning technology to new devices or improving the performance of prior art devices using the beam scanning technology. A good example of this ceaseless effort includes a projection display system featuring a high-resolution primary color re-productivity, head mounted display, laser printer, or the like.

A beam scanning system requiring a high spatial resolution, conventionally, must have a scanning mirror, which is capable of achieving a high scanning speed and a large angular displacement or tilting angle. However, in the case of a prior art method using a polygon mirror, there is a problem in that the polygon mirror is mounted on a drive motor having a high rotating speed, and therefore, a scanning speed, which is proportional to a rotating angular speed of the polygon mirror, depends on the rotating speed of the drive motor. Due to a limited rotating speed of conventional motors, therefore, increasing the scanning speed has a limit, and it is difficult to reduce the consumption of electricity and the volume of the overall system.

In addition, mechanical frictional noise of the drive motor must be essentially eliminated, and a complicated structure makes it difficult to achieve a reduction of manufacturing costs.

FIG. 1 is a schematic view illustrating a scanning device using a polygon mirror in accordance with the prior art. If an input light beam 5 is emitted from an optical source 1, the light beam 5 first passes through an optic 2 that is selected from among various lenses, and then, is reflected by a polygon mirror 3.

With this configuration, as the polygon mirror 3 is rotated by means of a motor 4 mounted underneath thereof, a light beam 6 is reflected by the polygon mirror 3, thereby being scanned in a predetermined direction 8. Here, the scanning direction 8 is determined based on a rotating direction 7 of the polygon mirror 3.

A problem of the above-described prior art scanning device using the polygon mirror 3 is in that it cannot be applied to a high-resolution display, or the like, although it achieves an unidirectional high scanning speed.

On the other hand, another prior art scanning device using a micro-mirror is able to achieve a bidirectional scanning ability and a high scanning speed of dozens of hertz. However, when the scanning device is driven at its operational limit, i.e. the bidirectional high scanning speed, it suffers from a dynamic deflection, causing the micro-mirror to waver during the operation of the scanning device. This is a cause of the distortion of a reflective plane of the micro-mirror, and consequently, the deterioration of a reflected light beam.

Accordingly, in order to achieve a high-performance optical scanning device, it is necessary to select the optimal material and structure of the micro-mirror suitable to restrict the dynamic deflection.

Meanwhile, considering a prior art electrostatic scanning micro-mirror using a vertical comb electrode, it requires a high alignment accuracy of a movable part or rotor and a fixed part or stator in the manufacture thereof. Furthermore, the electrostatic scanning micro-mirror has a difficulty in that a structure thereof must have a high aspect ratio, in order to increase a rotating angle.

Moreover, a movable comb electrode that is attached to a mirror plate and a fixed comb electrode that is located adjacent to the movable comb electrode cause an increase in the dampening of a drive force.

SUMMARY OF THE INVENTION

Therefore, the present invention has been made in view of the above problems, and it is a first object of the present invention to provide an optical scanning device having an integrated micro-mirror, which is designed to be driven using an electromagnetic phenomenon.

The micro-mirror provides a direction modulation or angle modulation function for modulating a path of a reflected light beam by a predetermined degree.

The micro-mirror also provides a scanning function for modulating a path of a reflected light beam by a predetermined degree for a predetermined period.

It is another object of the present invention to provide an optical scanning device using an electromagnetic micro-mirror, in which the micro-mirror has a thin layer structure provided with a reflective plane and a frame structure, whereby the deflection of the reflective plane during driving can be restricted, and a large scanning angle and a high scanning speed can be accomplished.

It is yet another object of the present invention to provide an optical scanning device using an electromagnetic micro-mirror, which can be manufactured via a series of semiconductor manufacturing processes and micro-machining technologies, whereby a light compact optical scanning device can be accomplished.

In accordance with one aspect of the present invention, the above and other objects can be accomplished by the provision of an electromagnetic scanning micro-mirror comprising: a magnetic field generator for supplying a magnetic field; a mirror plate having a reflective plane and a frame structure attached to a rear surface of the reflective plane; a substrate to surround the mirror plate; a pair of torsion bars to connect the mirror plate to the substrate; and a magnetic substance provided at the rear surface of the reflective plane of the mirror plate and adapted to generate a drive force by interacting with the magnetic field supplied from the magnetic field generator, wherein the mirror plate performs a rotation operation about the torsion bars, which define a rotating axis of the mirror plate, by use of the drive force generated from the magnetic substance.

Preferably, the frame structure may be an array of one or more unit frames.

Preferably, each of the unit frames may have a width gradually decreasing away from the rotating axis of the mirror plate.

Preferably, each of the unit frames may have a thickness gradually decreasing away from the rotating axis of the mirror plate.

Preferably, each of the unit frames may have an etched space through at least one predetermined position.

Preferably, the magnetic substance may be symmetrically or asymmetrically provided with respect to the rotating axis of the mirror plate.

Preferably, the magnetic substance may be attached to a surface of the frame structure, or is located at a rear surface of the mirror plate to be embedded in the surface of the frame structure.

Preferably, the magnetic substance may be an array of one or more unit magnets arranged parallel to each other along the rotating axis of the mirror plate.

Preferably, each of the unit magnets may have an elongated polygonal or elliptical shape having a longer length, which is perpendicular to the rotating axis of the mirror plate, than a width, which is parallel to the rotating axis, based on a plane parallel to the mirror plate.

Preferably, the magnetic substance may be made of a soft magnetic material.

Preferably, the magnetic field generator may include: an electric current source; and a coil to generate the magnetic field as an electric current supplied from the electric current source flows therethrough.

Preferably, the coil may be integrated in the substrate.

Preferably, the substrate may have upper and lower sections, which are separated from each other by interposing an insulation layer, and the torsion bars may be configured to connect the mirror plate to a selected one of the upper and lower sections of the substrate.

Preferably, the substrate may be a silicon on insulator (SOI) substrate.

Preferably, the micro-mirror may further comprise one or more regulation electrodes fixed to the substrate at positions adjacent to the mirror plate, and the mirror plate may be rotated by use of the drive force generated from the magnetic substance and an electric force generated from a potential difference that is applied between the regulation electrodes and the mirror plate.

Preferably, the mirror plate may further have movable electrodes located adjacent to the regulation electrodes on the frame structure, and the electric force, which is generated from the potential difference applied between the regulation electrodes and the mirror plate, may be equal to an electric force generated from a potential difference that is applied between the regulation electrodes and the movable electrodes.

Preferably, the electric force, which is generated from the potential difference applied between the regulation electrodes and the mirror plate, may be an attractive force between the mirror plate and the regulation electrodes.

In accordance with another aspect of the present invention, the above and other objects can be accomplished by the provision of an optical scanning device comprising: an electromagnetic scanning micro-mirror as set forth in claim 1; an optic to provide an incident light beam to the electromagnetic scanning micro-mirror; and an optic to output a light beam reflected from the electromagnetic scanning micro-mirror.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
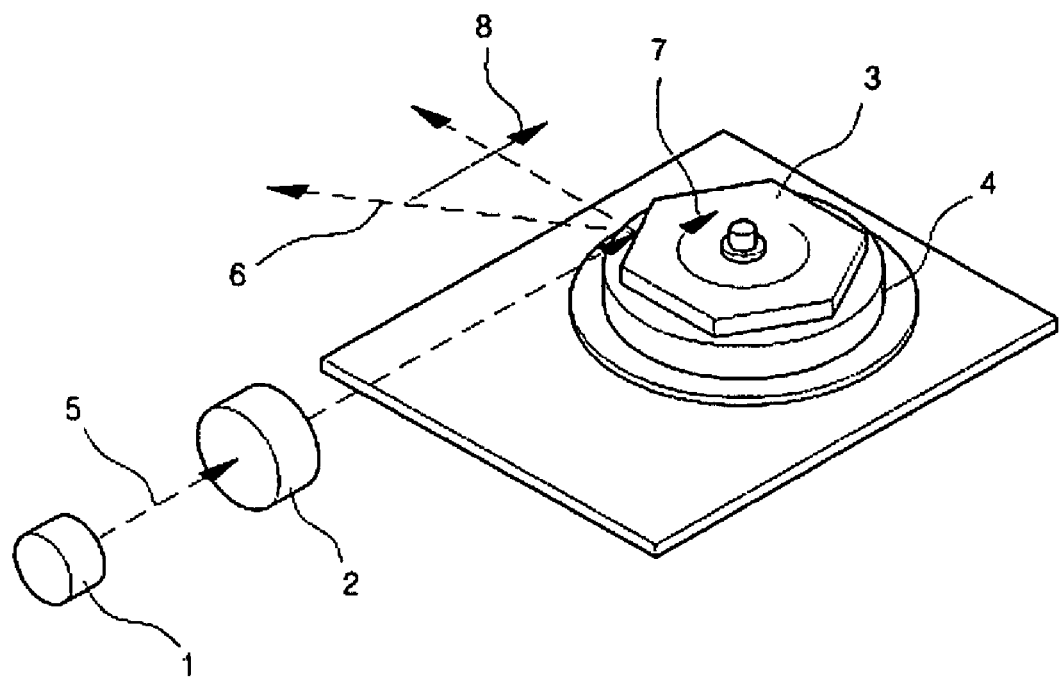
FIG. 1 is a perspective view illustrating an optical scanning device using a polygon mirror in accordance with the prior art.
Figure 2A:
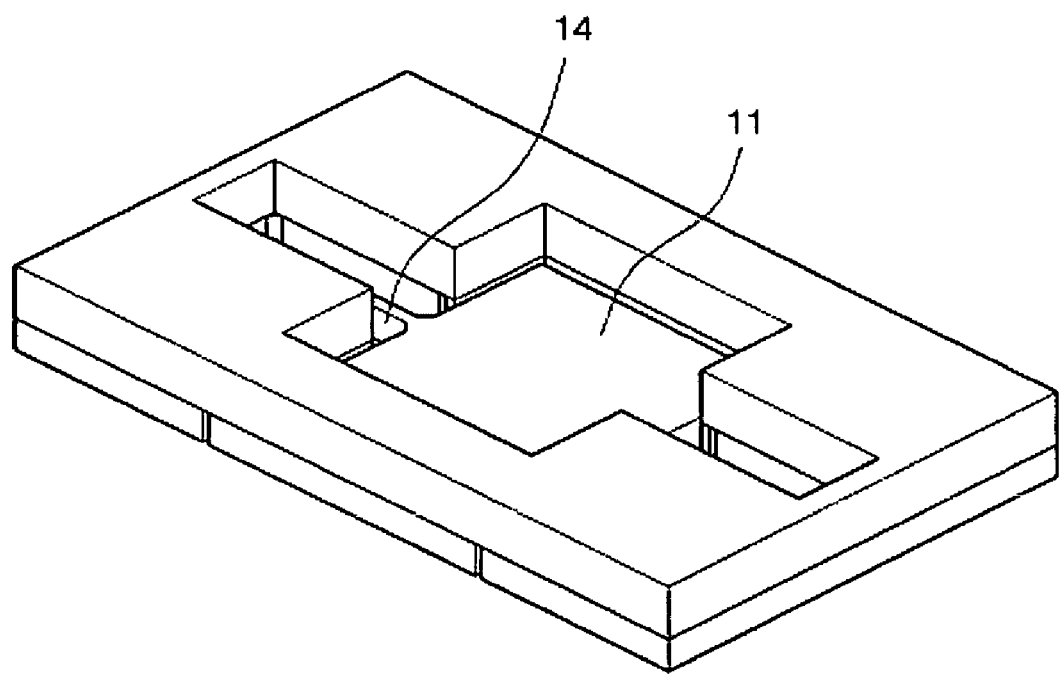
FIGS. 2A and 2B are perspective views illustrating a rear surface and a front surface, respectively, of an electromagnetic scanning micro-mirror in accordance with an embodiment of the present invention.
Figure 2B:
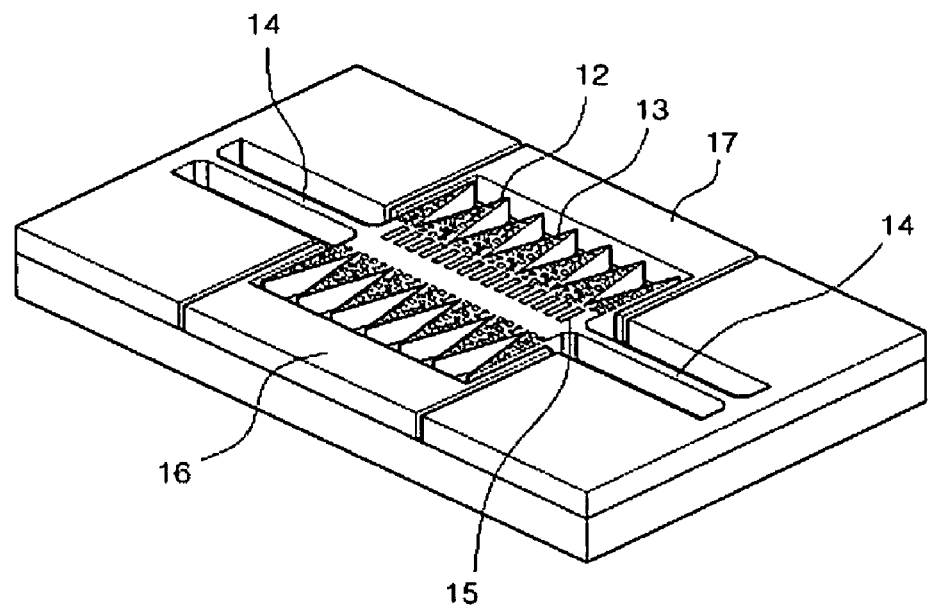

FIGS. 2A and 2B are perspective views illustrating an electromagnetic scanning mirror in accordance with an embodiment of the present invention. More particularly, FIG. 2A illustrates a reflective plane formed at a mirror plate, and FIG. 2B illustrates a frame structure formed at the mirror plate. Meanwhile, FIGS. 2A and 2B have no illustration of a magnetic force generator.

In the embodiment of the present invention, a scanning micro-mirror includes a mirror plate having a reflective plane 11 and a frame structure 12 attached to a rear surface of the reflective plane 11 to support the reflective plane 11, a substrate configured to surround the mirror plate, a pair of torsion bars 14 adapted to connect the mirror plate to the substrate, and a magnetic substance 15 formed on the frame structure 12. Also, a pair of regulation electrodes 16 and 17 are formed on the substrate at positions adjacent to the mirror plate.

The substrate of the present embodiment is divided into an upper section and a lower section by an insulation layer.

The reflective plane 11 is formed at one surface of the mirror plate to reflect a light beam irradiated thereto, and the frame structure 12 is formed at the other surface of the mirror plate to support the reflective plane 11. Now, the frame structure 12 will be explained in detail with reference to FIGS. 3A and 3B.

The mirror plate is supported by the pair of torsion bars 14, such that it is connected to the upper section of the substrate.

The torsion bars 14 are connected to opposite sides of the mirror plate symmetrical to the center of the mirror plate, respectively. The mirror plate is adapted to rotate about a rotating axis that connects the pair of torsion bars 14 to each other. That is, the torsion bars 14 serve to define the rotating axis when the mirror plate performs a rotating operation, and also provides a restoration torque.

In the present embodiment, the magnetic substance 15 is provided at the frame structure 12 of the mirror plate.

The magnetic substance 15 takes the form of an array of unit magnets which are arranged parallel to each other along the rotating axis of the mirror plate. Each of the unit magnets has an elongated rectangular shape having a longer length, which is perpendicular to the rotating axis of the mirror plate, than a width, which is parallel to the rotating axis, based on a plane parallel to the mirror plate.

In the present embodiment, the magnetic substance 15 is asymmetrically located at a side of the rotating axis of the mirror plate. Of course, alternatively, the magnetic substance 15 may be symmetrically located with respect to the rotating axis.

More particularly, the magnetic substance 15 may protrude upward from the frame structure 12, or may be embedded in a surface of the frame structure 12 as shown in FIG. 2B.

Figure 3A:
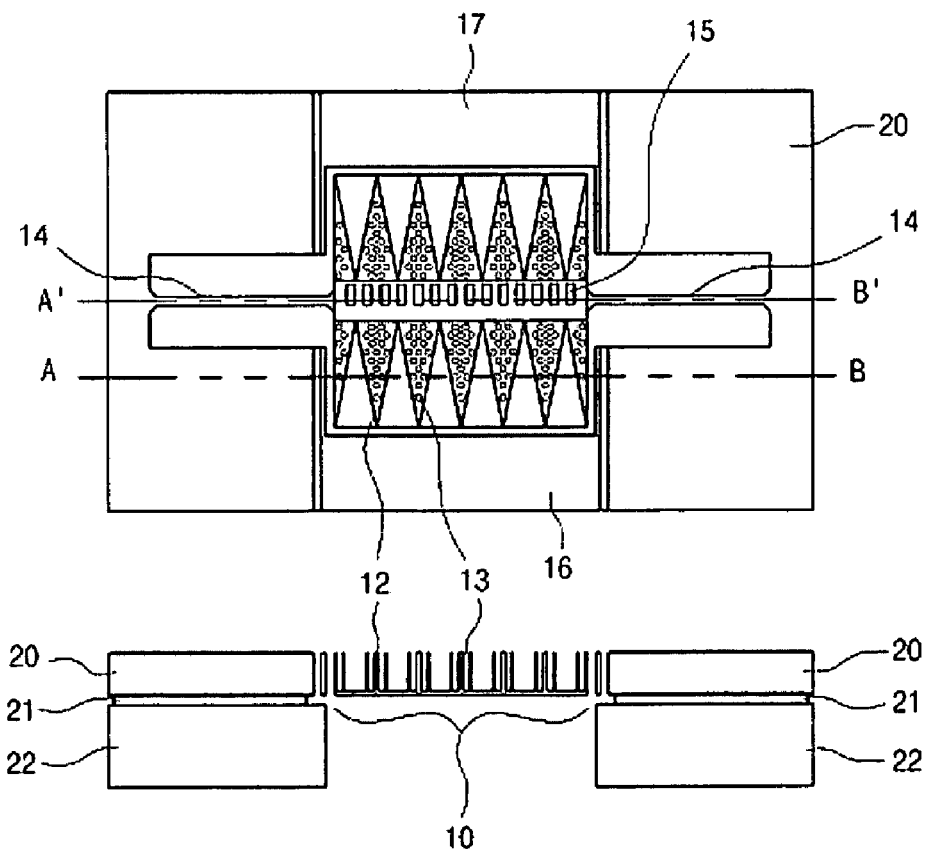
FIG. 3A is a plan view of FIG. 2B illustrating the front surface of the electromagnetic scanning micro-mirror, including a sectional view taken along the line A-B thereof.
Figure 3B:
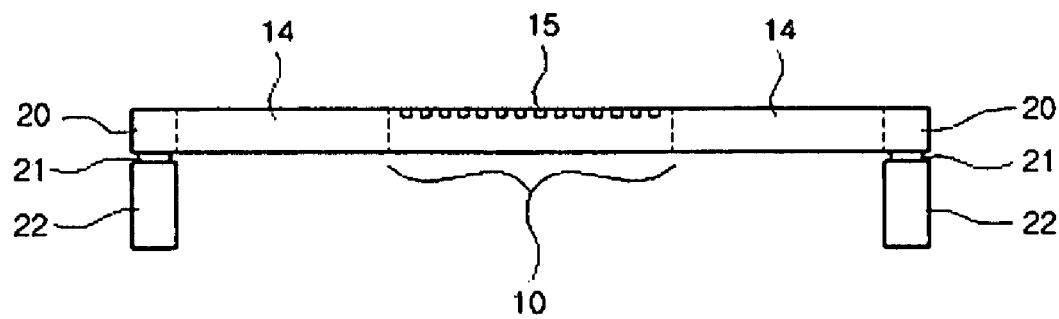
FIG. 3B is a sectional view taken along the line A'-B' of FIG. 3A illustrating the front surface of the electromagnetic scanning micro-mirror.

FIGS. 3A and 3B are a plan view and a sectional view illustrating the scanning micro-mirror in accordance with the present invention.

In the present embodiment, a substrate upper section 20 and a substrate lower section 22 are electrically separated from each other by an insulation layer 21. The insulation layer 21 serves as an etch-stop when the manufacture of the substrate or scanning micro-mirror includes an etching process.

The substrate of the present embodiment may be a silicon-on-insulator (SOI) substrate. Alternatively, the substrate may be fabricated by bonding two substrates. In the alternative embodiment, the insulation layer 21 is interposed before the substrate upper portion 20 and the substrate lower portion 22 are bonded to each other.

In the alternative embodiment, also, the mirror plate, substrate upper section 20, and torsion bars 14 may be integrally formed with one another. Also, when using the SOI substrate, a silicon portion of the substrate may be perforated via an etching process.

In the present embodiment, the scanning micro-mirror is configured such that the mirror plate 10, taking the form of a thin layer having an even thickness, is provided at one surface thereof with the reflective plane 11 and at the other surface thereof with the frame structure 12.

The frame structure 12 takes the form of an array of a plurality of unit frames arranged in parallel to one another. Each of the unit frames has a diamond shape, such that a width of the unit frame is largest close to the rotating axis of the mirror plate 10, and gradually decreases away from the rotating axis. Preferably, a thickness of the unit frame is largest close to the rotating axis of the mirror plate 10, and gradually decreases away from the rotating axis.

The frame structure 12 is partially etched with a plurality of holes 13. Etching the holes 13 has the effect of reducing the overall mass of the frame structure 12, and thus, of the mirror plate 10. This effectively eliminates the risk of dynamic deflection when the mirror plate 10 is rotated.

To drive the scanning micro-mirror of the present invention, a magnetic field must be supplied to the mirror plate 10 in a direction perpendicular to the substrate upper and lower sections 20 and 22. For this, a magnetic field generator (not shown) is provided in the scanning micro-mirror to generate the magnetic field.

The magnetic field generator may include an electric current source, and a coil to generate the magnetic field as an electric current, supplied from the electric current source, flows therethrough. The coil also serves to apply the generated magnetic field to the mirror plate 10. The coil may be integrated in the substrate, or may be separately located at a predetermined external position adjacent to the mirror plate.

Figure 4:
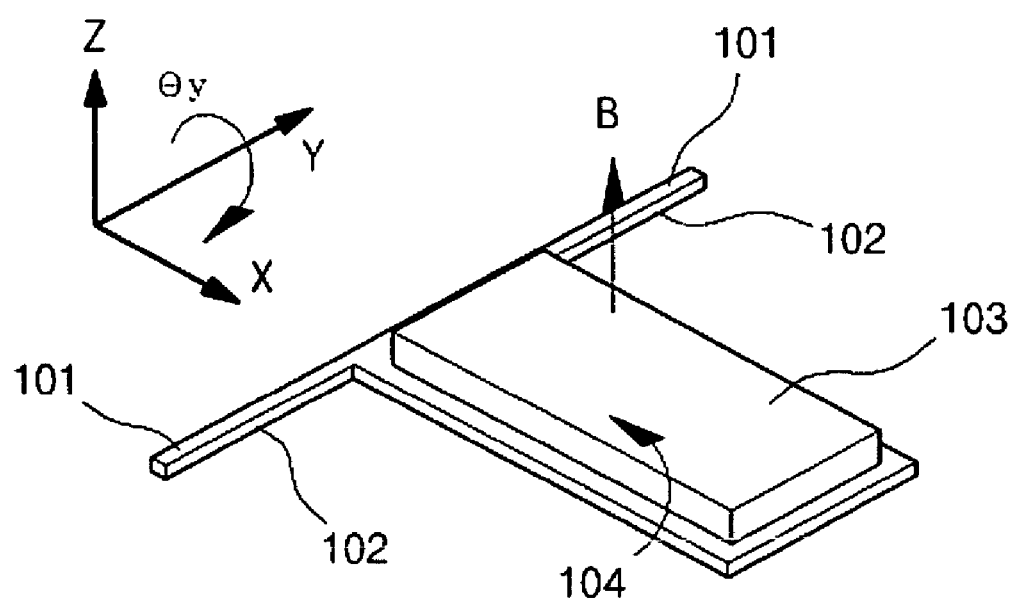
FIG. 4 is a perspective view illustrating the principle of operation employed in the present invention.
Figure 5:
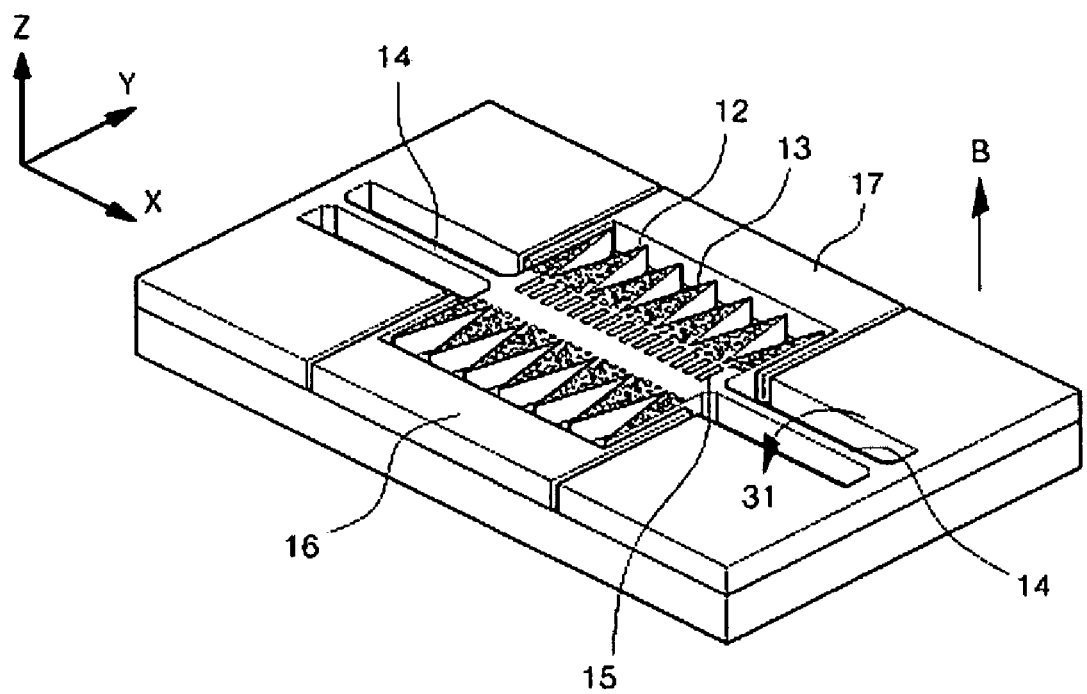
FIG. 5 is a perspective view illustrating the operation of the micro-mirror in accordance with the embodiment of the present invention.

FIGS. 4 and 5 are perspective views illustrating the principle of operation of the micro-mirror in accordance with the present invention.

Referring to FIG. 4, a torsion bar 102 is aligned in an Y-axis direction while being fixed at opposite ends 101 thereof. The torsion bar 102 is used to support a structure on which a magnetic substance 103 is attached. If a magnetic field is supplied in a z-axis direction perpendicular to a bottom surface of the magnetic substance 103, the magnetic substance 103 is subjected to a torque, which produces rotation about the torsion bar 102, that is, about the y-axis direction.

When the magnetic substance 103 is a permanent magnet, the torque acts in a $+\theta_y$ or $-\theta_y$ direction in accordance with the direction of a magnetic pole. This is similarly applicable to a magnetic substance made of a soft magnetic material, such as nickel. That is, the torque acts in a direction of an arrow 104 as shown in FIG. 4 based on a shape anisotropy.

Accordingly, a rotating angle of the magnetic substance is determined such that a drive torque generated by an external magnetic field is equal to an opposite restoration torque generated by the deflection of the torsion bar 102.

In accordance with the above-described principle, if an external magnetic field is supplied in the z-axis direction to the electromagnetic micro-mirror of the present invention, a torque acts on the micro-mirror in a direction of an arrow 31 as shown in FIG. 5, to produce rotation about the torsion bars 14 aligned in an x-axis direction.

In the embodiment of FIG. 5, accordingly, if an external magnetic field is supplied from the magnetic field generator (not shown), a torque is generated by the magnetic substance 15, to produce rotation of the mirror plate.

Preferably, the magnetic substance 15, used to obtain the torque in accordance with the principle of operation as explained with reference to FIG. 4, is an array of the unit magnets asymmetrically arranged with respect to the rotating axis of the mirror plate. Each of the unit magnets may have an elongated polygonal or elliptical shape having a longer length, which is perpendicular to the rotating axis of the mirror plate, than a width, which is parallel to the rotating axis, on a plane parallel to the mirror plate. Also, the unit magnet is made of a soft magnetic material, to produce a drive force based on a shape anisotropy thereof.

If the external magnetic field, supplied to the magnetic substance 15, is removed, the micro-mirror is rotated in an opposite direction under the influence of a restoration force of the torsion bars, and therefore, the micro-mirror can perform bidirectional rotating movements. In this way, based on the fact that, if the direction of the external magnetic field supplied from the magnetic field generator is changed, the rotating direction of the micro-mirror is changed, the micro-mirror can be rotated in opposite directions by repeatedly changing the direction of the magnetic field.

In the scanning micro-mirror of the present invention, it is necessary to regulate a drive force thereof. The drive force of the micro-mirror may be regulated by use of the strength of the magnetic field supplied from the magnetic field generator as well as the material characteristics of the magnetic substance. In accordance with the embodiment of the present invention, a potential difference is applied between the mirror plate and the regulation electrodes 16 and 17, to produce an electrostatic force obstructing the drive of the micro-mirror.

The regulation electrodes 16 and 17 are fixed to the substrate at positions adjacent to the mirror plate. Applying the potential difference between the mirror plate and the regulation electrodes 16 and 17 has the effect of generating an electrical attraction therebetween. Such an electrical attraction acts to push the mirror plate toward the regulation electrodes 16 and 17, and therefore, is opposite to the drive force of the magnetic substance 15, which is used to rotate the mirror plate. Accordingly, the rotating movements of the mirror plate can be controlled by use of both the electrical attraction and the drive force. The electrical attraction is easy to control as compared to the drive force of the magnetic substance, and therefore, the operation of the scanning micro-mirror can be more accurately and finely controlled.

Instead of generating the electrical attraction by applying the potential difference between the overall mirror plate and the regulation electrodes, alternatively, movable electrodes may be separately disposed on the frame structure 12 of the mirror plate to generate an electrical attraction by use of a potential difference between the regulation electrodes and the movable electrodes.

The scanning micro-mirror of the present invention as described above may be combined with one or more lenses, such as for example, an optic to provide an incident light beam from an optical source to the scanning micro-mirror and an optic to output a light beam reflected from the scanning micro-mirror, and other drive elements required to rotate the scanning micro-mirror, to form an optical scanning device.

More particularly, the optical scanning device is preferably provided with an expansion lens to expand the light beam reflected from the scanning micro-mirror.

As apparent from the above description, the present invention provides a scanning micro-mirror, which is applicable to various devices to scan a light beam, emitted from an optical source, to a predetermined region, for forming an image or reading position or image data.

The scanning micro-mirror according to the present invention can be manufactured via a series of semiconductor manufacturing processes and micro-machining technologies, whereby a light compact configuration thereof can be accomplished while achieving a remarkable improvement in optical and mechanical performances. This has the effect of reducing the cost of parts and the consumption of electricity required to electromagnetically drive the micro-mirror.

Further, the scanning micro-mirror according to the present invention can achieve a simplified structure having no necessity for electric wires of a movable structure, whereby high mass-productivity, reduced product costs, and light and compact configuration can be accomplished.

Furthermore, the scanning micro-mirror can achieve an improvement in structural stability, optical performance, and weight reduction, as compared to prior art micro-mirrors. Therefore, the scanning micro-mirror of the present invention is suitable for a high-performance scanning system requiring a high scanning speed and wide scanning range, and can be widely used in various fields including a system requiring a static displacement of the micro-mirror.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An electromagnetic scanning micro-mirror comprising:
    a magnetic field generator for supplying a magnetic field;
    a mirror plate having a reflective plane and a frame structure attached to a rear surface of the reflective plane, wherein the frame structure is an array comprising at least two unit frames, each of which has a width gradually decreasing away from a rotating axis of the mirror plate;
    a substrate to surround the mirror plate;
    a pair of torsion bars to connect the mirror plate to the substrate; and
    a magnetic substance provided at the rear surface of the reflective plane of the mirror plate and adapted to generate a drive force by interacting with the magnetic field supplied from the magnetic field generator,
    wherein the mirror plate performs a rotation operation about the torsion bars, which define the rotating axis of the mirror plate, by use of the drive force generated from the magnetic substance.

2. The micro-mirror as set forth in claim 1, wherein each of the unit frames has a thickness gradually decreasing away from the rotating axis of the mirror plate.

3. The micro-mirror as set forth in claim 1, wherein each of the unit frames has an etched space through at least one predetermined position.

4. The micro-mirror as set forth in claim 1, wherein the magnetic substance is symmetrically or asymmetrically provided with respect to the rotating axis of the mirror plate.

5. The micro-mirror as set forth in claim 1, wherein the magnetic substance is attached to a surface of the frame structure, or is located at a rear surface of the mirror plate to be embedded in the surface of the frame structure.

6. The micro-mirror as set forth in claim 1, wherein the magnetic substance is an array of one or more unit magnets arranged parallel to each other along the rotating axis of the mirror plate.

7. The micro-mirror as set forth in claim 6, wherein each of the unit magnets has an elongated polygonal or elliptical shape having a longer length, which is perpendicular to the rotating axis of the mirror plate, than a width, which is parallel to the rotating axis, based on a plane parallel to the mirror plate.

8. The micro-mirror as set forth in claim 1, wherein the magnetic substance is made of a soft magnetic material.

9. The micro-mirror as set forth in claim 1, wherein the magnetic field generator includes:
an electric current source; and
a coil to generate the magnetic field as an electric current supplied from the electric current source flows therethrough.

10. The micro-mirror as set forth in claim 9, wherein the coil is integrated in the substrate.

11. The micro-mirror as set forth in claim 1, wherein the substrate has upper and lower sections, which are separated from each other by interposing an insulation layer, and the torsion bars are configured to connect the mirror plate to a selected one of the upper and lower sections of the substrate.

12. The micro-mirror as set forth in claim 11, wherein the substrate is a silicon on insulator (SOI) substrate.

13. The micro-mirror as set forth in claim 1, further comprising one or more regulation electrodes fixed to the substrate at positions adjacent to the mirror plate,
wherein the mirror plate is rotated by use of the drive force generated from the magnetic substance and an electric force generated from a potential difference that is applied between the regulation electrodes and the mirror plate.

14. The micro-mirror as set forth in claim 13, wherein the mirror plate further has movable electrodes located adjacent to the regulation electrodes on the frame structure, and the electric force, which is generated from the potential difference applied between the regulation electrodes and the mirror plate, is equal to an electric force generated from a potential difference that is applied between the regulation electrodes and the movable electrodes.

15. The micro-mirror as set forth in claim 13, wherein the electric force, which is generated from the potential difference applied between the regulation electrodes and the mirror plate, is an attractive force between the mirror plate and the regulation electrodes.

16. An optical scanning device comprising:
an electromagnetic scanning micro-mirror as set forth in claim 1;
an optic to provide an incident light beam to the electromagnetic scanning micro-mirror; and
an optic to output a light beam reflected from the electromagnetic scanning micro-mirror.

17. An electromagnetic scanning micro-mirror comprising:
a magnetic field generator for supplying a magnetic field;
a mirror plate having a reflective plane and a frame structure attached to a rear surface of the reflective plane;
a substrate to surround the mirror plate;
a pair of torsion bars to connect the mirror plate to the substrate; and
a magnetic substance provided at the rear surface of the reflective plane of the mirror plate and adapted to generate a drive force by interacting with the magnetic field supplied from the magnetic field generator, wherein the mirror plate performs a rotation operation about the torsion bars, which define a rotating axis of the mirror plate, by use of the drive force generated from the magnetic substance; and
one or more regulation electrodes fixed to the substrate at positions adjacent to the mirror plate, which is rotated by use of the drive force generated from the magnetic substance and an electric force generated from a potential difference that is applied between the regulation electrodes and the mirror plate,
wherein the mirror plate further has movable electrodes located adjacent to the regulation electrodes on the frame structure, and the electric force, which is generated from the potential difference applied between the regulation electrodes and the mirror plate, is equal to an electric force generated from a potential difference that is applied between the regulation electrodes and the movable electrodes.

18. The micro-mirror as set forth in claim 17, wherein the electric force, which is generated from the potential difference applied between the regulation electrodes and the mirror plate, is an attractive force between the mirror plate and the regulation electrodes.

* * * * *